United States Patent
Chang et al.

(10) Patent No.: US 9,002,933 B1
(45) Date of Patent: Apr. 7, 2015

(54) USER INTERACTION-BASED DATA SHARING VIA CLOUD-BASED REMOTE SERVERS

(71) Applicant: Oxygen Cloud, Inc., Redwood City, CA (US)

(72) Inventors: Peter C. Chang, Union City, CA (US); Leo N. Leung, Belmont, CA (US); Anthony D. Magliulo, Fremont, CA (US)

(73) Assignee: Oxygen Cloud, Inc., Redwood City, CA (US)

( * ) Notice: Subject to any disclaimer, the term of this patent is extended or adjusted under 35 U.S.C. 154(b) by 203 days.

(21) Appl. No.: 13/708,591

(22) Filed: Dec. 7, 2012

(51) Int. Cl.
*G06F 15/16* (2006.01)
*H04L 29/06* (2006.01)

(52) U.S. Cl.
CPC ...................................... *H04L 67/42* (2013.01)

(58) Field of Classification Search
USPC .................. 709/203; 706/45; 711/25, 37, 57; 345/169
See application file for complete search history.

(56) References Cited

U.S. PATENT DOCUMENTS

| | | | | |
|---|---|---|---|---|
| 5,758,032 | A * | 5/1998 | Sanders | 706/45 |
| 7,937,623 | B2 * | 5/2011 | Ramacher et al. | 714/37 |
| 8,239,167 | B2 * | 8/2012 | Ramacher et al. | 702/184 |
| 8,296,104 | B2 * | 10/2012 | Ramacher et al. | 702/184 |
| 8,429,467 | B2 * | 4/2013 | Fallen et al. | 714/57 |
| 8,744,990 | B2 * | 6/2014 | Ahrens et al. | 706/47 |
| 2009/0105991 | A1 * | 4/2009 | Ramacher et al. | 702/184 |
| 2009/0106278 | A1 * | 4/2009 | Ramacher et al. | 707/100 |
| 2009/0106589 | A1 * | 4/2009 | Ramacher et al. | 714/25 |
| 2009/0106596 | A1 * | 4/2009 | Fallen et al. | 714/37 |
| 2013/0328783 | A1 * | 12/2013 | Martin et al. | 345/169 |

* cited by examiner

*Primary Examiner* — Tammy Nguyen
(74) *Attorney, Agent, or Firm* — Kilpatrick Townsend & Stockton LLP

(57) ABSTRACT

Methods, apparatus and systems for sharing data based on user interactions. User interactions with data, such as creating a file, opening a file, or modifying a file, are monitored by a user computing device. When the user interactions satisfy a data-interaction condition defined by a set of rules, information associated with the user interaction is communicated to a remote server for subsequent sharing with the user or another recipient. The information associated with the user interaction may include data, metadata, and or contextual data.

25 Claims, 8 Drawing Sheets

USER INTERACTION-BASED DATA SHARING VIA CLOUD-BASED REMOTE SERVERS

BACKGROUND

Embodiments of the present invention relate to the global sharing of and access to electronic resources, and in particular to sharing data based on user interactions with the data.

As long as electronic resources have been available there has been an interest in sharing those resources. Prior to the proliferation of networked electronic devices, data would often be stored onto electronic media such as punched tape, magnetic cassettes, floppy disks, and the like. With modern advances in network connectivity the need for portable data storage media has decreased while the desire to share electronic resources over widespread computer networks has increased.

Numerous techniques for sharing electronic resources over computer networks are in use today. For example, Dropbox™ by Dropbox, Inc. of San Francisco, Calif. provides cloud storage by which users can copy data between computers having the Dropbox™ software installed and share data with others. To do so, a networked folder is provided on the user's computer, and any data that the user moves to that networked folder can be synchronized with remote servers. The user may then access the data on the remote servers from another device having the Dropbox™ software installed or share the data on the remote servers with others by sending a link to a website where the other individuals may download the data.

While the more recent provisions for sharing data between users via networked computing systems provide enhancements over traditional file sharing such as copying data to portable storage devices (such as CD's, DVD's, USB keys, and the like), all of these known techniques suffer from numerous deficiencies. For example, in a typical network-based data-sharing scenario, a user must explicitly identify specific data (e.g., a particular file) and then explicitly request that the identified data be shared (e.g., by dragging and dropping an icon representing the identified file from its host directory to a destination directory). Such tasks are not only burdensome but also inefficient.

BRIEF SUMMARY

Embodiments of the present invention overcome some or all of the aforementioned deficiencies in the related art and provide one or more additional advantages as discussed herein. In one embodiment, a method of operating a user computing device is disclosed. The method includes storing, by the user computing device, a set of rules that define data-interaction conditions, the data-interaction conditions indicating different types of activities that a user of the user computing device can perform on one or more data accessible by the user computing device. The method further includes monitoring, by the user computing device, the user's interaction with the one or more data accessible by the user computing device to determine whether any of the data-interaction conditions defined by the set of rules are satisfied by the user's interaction with the one or more data accessible by the user computing device. Upon determining that at least one of the data-interaction conditions defined by the set of rules is satisfied, information associated with the user's interaction that satisfied the at least one data-interaction condition is identified, and the identified information associated with the user's interaction that satisfied the at least one data-interaction condition is caused to be communicated from the user computing device to a remote server without receiving an explicit request from the user to communicate the identified information.

In at least one embodiment, the identified information includes the data interacted with by the user during the interaction that satisfied the at least one data-interaction condition. In another embodiment, the identified information includes information describing a context of the user's interaction that satisfied the at least one data-interaction condition.

In some embodiments, the different types of activities include: the user opening a file, the user closing a file, the user modifying a file, the user creating a file, the user deleting a file, the user printing a file, the user compressing a file, the user accessing a file, the user opening an attachment to an email or other message, the user attaching a file to an email or other message, the user downloading a file from a remote server, the user uploading a file to a remote server, the user accessing properties of a file, the user causing an application to interact with a file, and the user interacting with network traffic over a network coupled to the user computing device.

In at least one embodiment, monitoring the user's interaction with the one or more data includes one or more of: monitoring the user's interaction with an operating system executing on the user computing device, monitoring applications caused to be executed by the user, monitoring the user's interaction with one or more applications, and monitoring network traffic caused by the user to be communicated over a network coupled to the user computing device.

Embodiments are also directed to user computing device. In one embodiment, a user computing device includes a storage element for storing a set of rules that define data-interaction conditions, the data-interaction conditions indicating different types of activities that a user of the user computing device can perform on one or more data accessible by the user computing device. The user computing device further includes a user interface for receiving user interactions with one or more data accessible by the user computing device. The user computing device also includes a monitoring agent for monitoring the user's interaction with the one or more data accessible by the user computing device. The user computing device further includes a filtering agent for receiving, from the monitoring agent, information identifying the user's interaction with the one or more data accessible by the user computing device. The filtering agent may also determine whether any of the data-interaction conditions defined by the set of rules are satisfied by the user's interaction with the one or more data accessible by the user computing device, and identify, upon determining that at least one of the data-interaction conditions defined by the set of rules is satisfied, information associated with the user's interaction that satisfied the at least one data-interaction condition. The user computing device also includes a communication interface for causing, upon the filtering agent determining that at least one of the data-interaction conditions defined by the set of rules is satisfied, and without receiving an explicit request from the user to communicate the identified information, the identified information associated with the user's interaction that satisfied the at least one data-interaction condition to be communicated from the user computing device to a remote server.

Embodiments are also directed to a method of managing the storage of data. In one embodiment, the method includes monitoring, at a user computing device, a user's interaction with one or more data accessible by the user computing device to determine whether any of a plurality of data-interaction conditions defined by a set of rules are satisfied by the user's interaction with the one or more data. The method also includes upon determining that at least one of the data-interaction conditions is satisfied: identifying information associated with the user's interaction that satisfied the at least one data-interaction condition, and causing, without receiving an explicit request from the user to communicate the identified information, the identified information associated with the user's interaction that satisfied the at least one data-interaction condition to be communicated to a remote server. The method further includes receiving, at the remote server, the identified information. The method also includes identifying, at the remote server, an account associated with the user, and storing the received identified information at the remote server such that the identified information is associated with the account.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the present invention generally relate to techniques for sharing data based on user interactions with the data. By monitoring a user's interactions with data, interactions such as creating a file, opening a file, modifying a file, etc., and sharing the data with others based on the user's interactions, the need for a user to explicitly request a resource to be shared may advantageously be obviated. In some embodiments, a set of rules that define data-interaction conditions may be stored at or otherwise accessible to a user computing device. The data-interaction conditions may include, for example, the creation of data, the opening of data, the modification of data, etc. As the user interacts with data on the user computing device, the user's interactions may be monitored to see whether they satisfy one or more of the data-interaction conditions. If the user's interactions do satisfy one or more of the data-interaction conditions, then data associated with the user's interaction may be communicated to a remote server (e.g., a cloud-based server) for subsequent access by the user or one or more other recipients. In contrast, if the user's interactions do not satisfy any of the data-interaction conditions, then the data may not be communicated to the remote server. The type of data that is communicated in the event a data-interaction condition is satisfied may also be defined by the set of rules. For example, the set of rules may indicate that contextual data describing a context of the user interaction should be communicated. Such contextual data may include, for example, information identifying an application used by the user to access the data, an operating system used by the user, the type of user interaction that occurred, etc. Accordingly, not only is data timely communicated to a remote server in response to a user's particular interaction with that data, the data communicated to the remote server may be comprehensive (i.e., including metadata and contextual data) thereby advantageously facilitating subsequent intelligent processing by the remote server.

Figure 1:
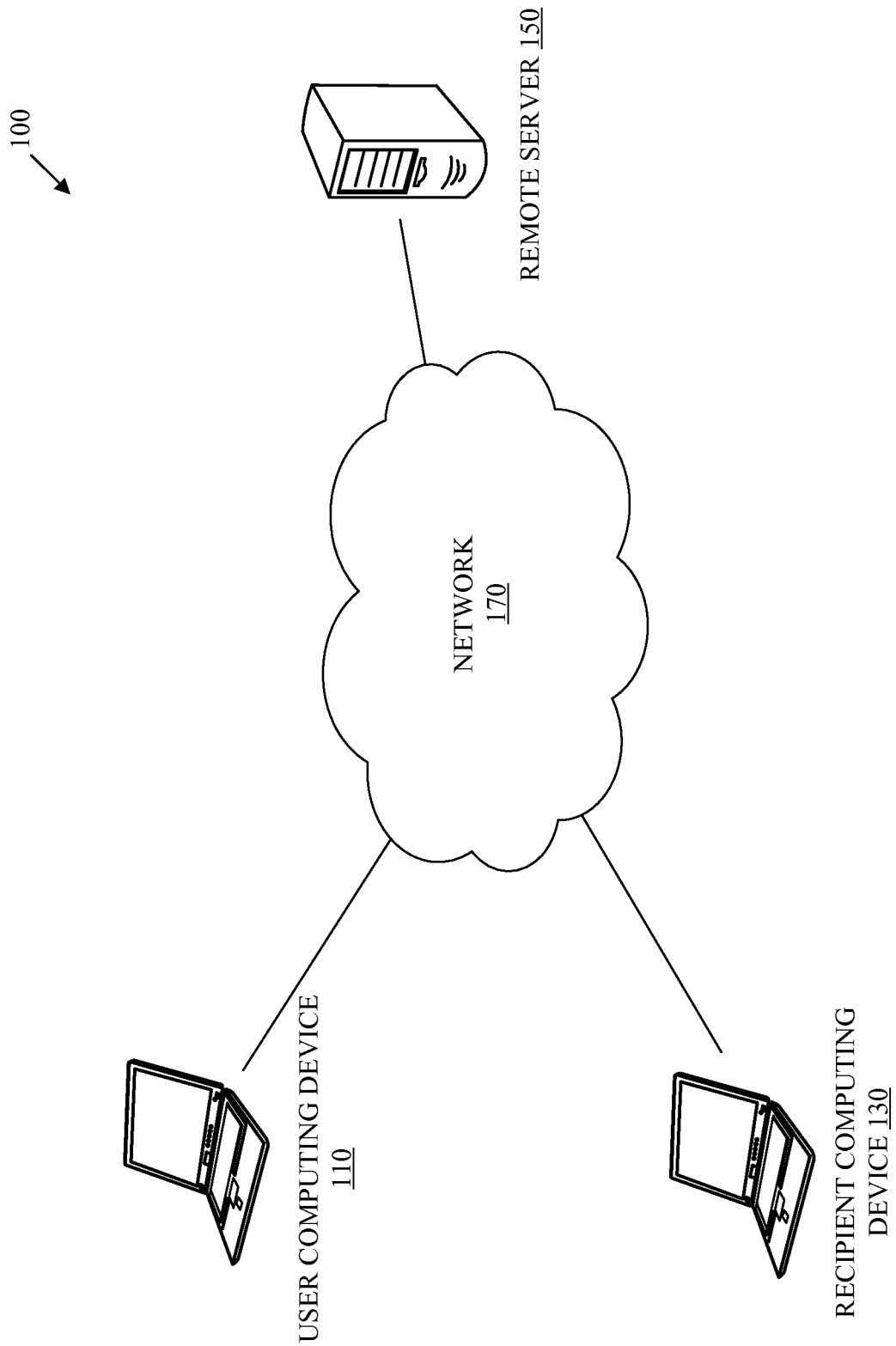
FIG. 1 is a simplified system for sharing data based on user interaction events according to an embodiment.

Referring now to the drawings, in which like reference numerals represent like parts throughout the several views, FIG. 1 provides a simplified system 100 illustrating an environment operable to implement aspects of one or more of the embodiments disclosed herein. System 100 includes a user computing device 110, one or more recipient computing devices 130, and a remote server 150, all interconnected via a network 170.

User computing device 110 and recipient computing device 130 may include any suitable electronic computing devices, such as a mobile phone, a personal digital assistant (PDA), a handheld or portable device (iPhone™, Blackberry™, etc.), a notebook, personal computer, note pad or other electronic device configured for wired or wireless communication. The user computing device 110 may be associated with a user desiring to share or otherwise make accessible information stored on or otherwise accessible to user computing device 110. For example, the user may wish to share information stored on user computing device 110 with a recipient associated with the recipient computing device 130. For another example, the user may wish to make information stored on user computing device 110 accessible to the user when the user uses an electronic computing device other than the user computing device 110 (e.g., the recipient computing device 130).

Remote server 150 may be any suitable electronic computing device or system of electronic computing devices operable to store and disseminate data files including data objects and contextual information. In some embodiments, remote server 150 may be a plurality of networked computing devices whereby portions of the data files are stored on one or more of the computing devices. For simplicity, remote server 150 is shown and discussed as a single computing device, although a person of ordinary skill in the art would recognize that remote server 150 may be implemented as a plurality of devices and/or storage elements. The remote server is located remote from the user computing device 110 and, in some embodiments, may be a cloud-based server.

Network 170 is any suitable network for enabling communications between various entities, such as between user computing device 110 and remote server 150, and between recipient computing device 130 and remote server 150. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self-organizing peer-to-peer topologies, and combinations thereof. Components utilized for such a system may depend at least in part upon the type of network and/or environment selected. Network 170 may utilize any suitable protocol, such as TCP/IP, OSI, FTP, UPnP, NFS, CIFS, and AppleTalk™. Communication over the network may be enabled by wired or wireless connections, and combinations thereof.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. For example, in some embodiments, a recipient computing device 130 separate from the user computing device 110 may be omitted as the same user computing device 110 may be used to both source data to the remote server 150 and subsequently access that data. Thus, the depiction of system 100 in FIG. 1 should be taken as being illustrative in nature, and not limiting to the scope of the disclosure.

Figure 2:
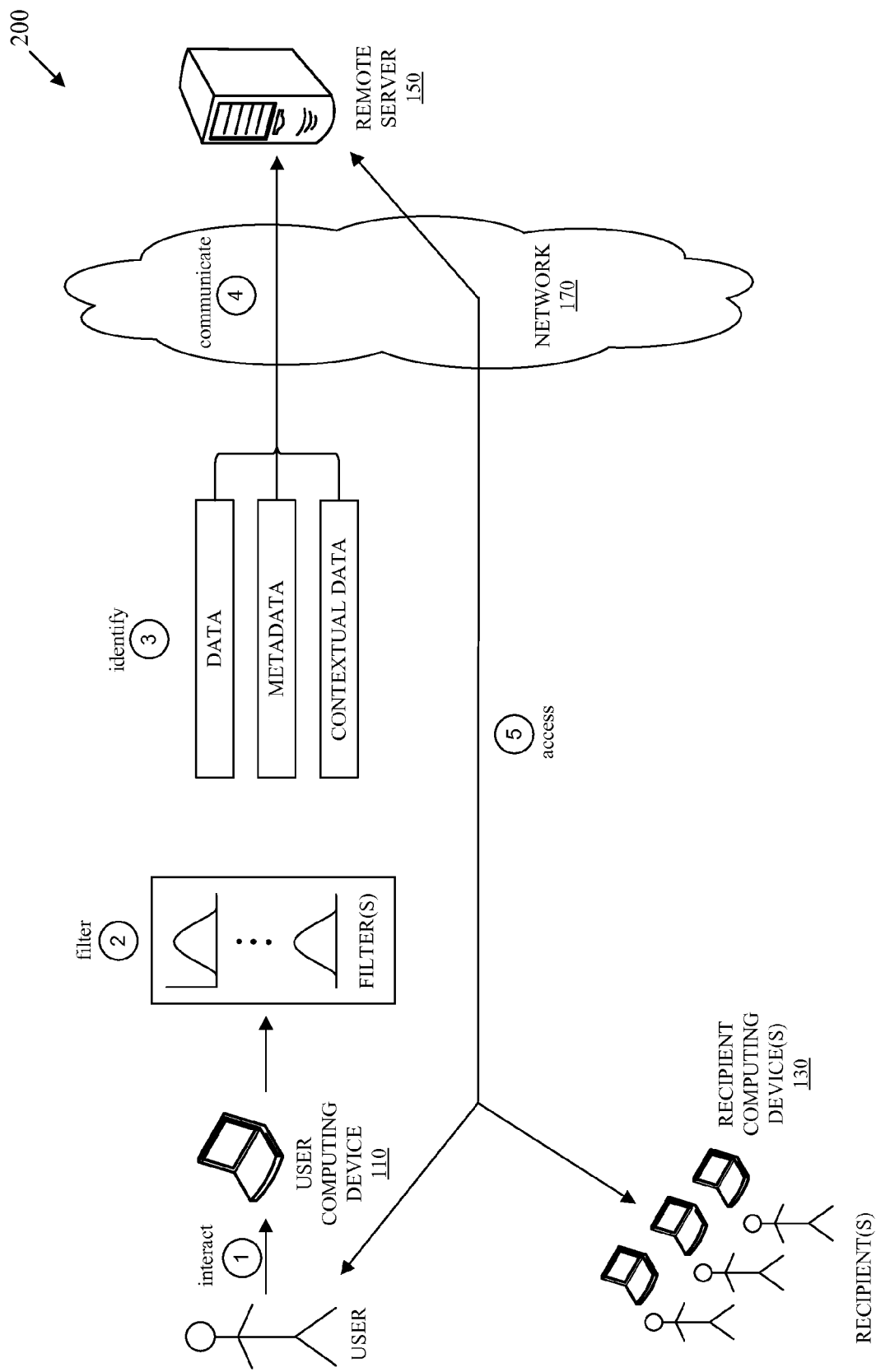
FIG. 2 depicts a method for sharing data based on user interaction events according to an embodiment.

FIG. 2 depicts a method for sharing data based on user interaction events according to an embodiment. At step 1 the user may perform a variety of user interaction events at the user computing device 110. For example, the user may create a file, open a file, modify a file, access a file, etc. The user's activities may be performed with reference to data stored at the user computing device 110 or otherwise accessible to the user computing device 110 (e.g., data stored on a backup storage unit, not shown).

Software or hardware logic executing on the user computing device 110 may monitor the user's activities at the user computing device 110. For the sake of simplicity rather than limitation, the operation of the logic will be described in the context of a software application resident on and being executed by the user computing device 110. The application may include a set of rules that define particular user interactions (e.g., opening a JPEG file) and the consequences resulting from the user's activities satisfying those particular user interactions (e.g., send contextual information identifying the software application used to open the JPEG file to the remote server). At step 2, the user's activities are filtered, whereby only those activities that satisfy the particular user interactions defined by the set of rules pass through the filter(s).

A plethora of information may be generated by or is otherwise associated with any particular user interaction. For example, when a user opens a JPEG file, data may include the actual JPEG file opened, metadata may include information regarding the JPEG file such as when the JPEG file was created, the size of the JPEG file, when the JPEG file was last modified, etc. Further, contextual data may include information indicating the software application that was used to open the JPEG file, the operating system used by the software application, etc.

Some or all of this information may be communicated to the remote server. Accordingly, at step 3, the software application identifies which of this information is to be communicated. As described, the set of rules may define the consequences resulting from the user's activities satisfying a particular user interaction. These consequences may include indicating that all or a subset of the data, metadata, and contextual data impacted by the user's activity should be communicated to the remote server.

At step 4 the identified information is communicated to the remote server 150 without the user's explicit request to do so. For example, the monitoring, filtering, and communication activities may be executed in the background, perhaps without the user's knowledge, such that the identified information may be communicated to the remote server without the user's explicit instruction to do so (e.g., without the user performing a drag and drop, copy and paste, or other explicit instruction requesting the data be communicated to the remote server). The remote server 150 may store the received information and associate the information with an account attributed to the user. Once the information is stored at the remote server 150, the remote server 150 may, in step 5, allow the user or other identified recipient access to the information. Allowing access to the stored information may include communicating the information to the user that provided the information and/or other identified recipients such as recipients associated with recipient computing devices 130.

It should be recognized that the monitored user activities generally exclude activities indicating an explicit request by the user to send data to the remote server 150. Further, the user may not be explicitly notified of the communication of information. In this fashion, data interacted with by the user (and/or related data such as contextual data) may be communicated to a remote server for remote access in the background without the user having to explicitly request such data sharing.

It should be appreciated that the specific steps illustrated in and described with reference to FIG. 2 provide a particular method of sharing data based on user interaction events, according to certain embodiments of the present invention. Other sequences of operations may also be performed according to alternative embodiments. For example, alternative embodiments of the present invention may perform the operations outlined above in a different order. Moreover, the individual operations illustrated in FIG. 2 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 3:
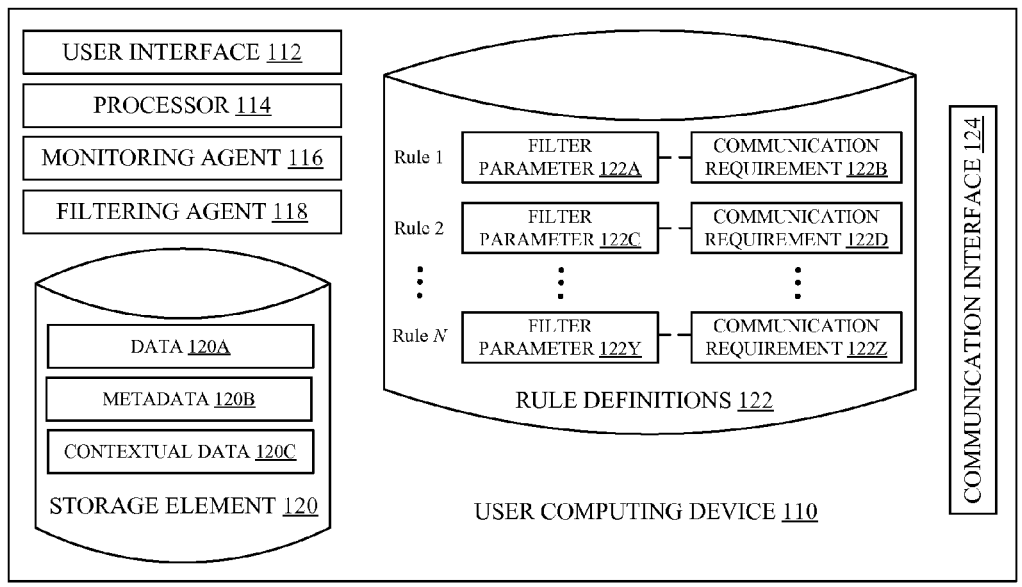
FIG. 3 is a simplified block diagram of a user computing device according to an embodiment.

FIG. 3 is a simplified block diagram of user computing device 110 according to an embodiment. The user computing device 110 may include any suitable components typically found in such electronic device necessary to perform the operations discussed herein. In one embodiment and as illustrated in FIG. 3, the user computing device 110 includes a user interface 112, a processor 114, a monitoring agent 116, a filtering agent 118, a storage element 120, rule definitions 122, and a communication interface 124.

User interface 112 may include one or more elements for receiving input from a user and providing outputs to the user. For example, user interface 112 may include a keypad, a display, a touch screen, or a combination thereof. Processor 114 is any suitable computing processor or processors operable to execute instructions that cause user computing device 110 to perform one or more of the operations discussed herein. For example, processor 114 may execute software code stored in one or more storage elements such as storage element 120. Communication interface 124 is any suitable interface or interfaces operable to enable communication between user computing device 110 and other elements of system 100, such as remote server 150.

Storage element 120 may be any storage element or storage elements suitable for storing data, software code, and other information used by user computing device 110. For example, storage element 120 may include one or more of random access memory (RAM), read only memory (ROM), electrically-erasable programmable read only memory (EEPROM), a hard disk, an optical disk, etc. In some embodiments, storage element 120 may include data 120A, metadata 120B, and contextual data 120C.

Rule definitions 122 may be implemented in storage element 120 or in a storage element similar to but separate from storage element 120. Rule definitions may include a set of rules, Rule 1 through Rule N, that define data-interaction conditions, the data-interaction conditions indicating different types of activities that a user of the user computing device can perform on one or more data accessible by the user computing device. The data-interaction conditions may be implemented as filter parameters, such as filter parameters 122A, 122C, through 122Y, where each filter parameter is associated with a particular rule.

The filter parameters define specific user activities, such as the user opening a file, the user closing a file, the user modifying a file, the user creating a file, the user deleting a file, the user printing a file, the user compressing a file, the user accessing a file, the user opening an attachment to an email or other message, the user attaching a file to an email or other message, the user downloading a file from a remote server, the user uploading a file to a remote server, the user accessing properties of a file, the user causing an application to interact with a file, and the user interacting with network traffic over a network coupled to the user computing device, etc.

Applications interacted with may be stored and/or executed by the user computing device 110 or other entities of system 100, such as recipient computing device 130, remote server 150, or another electronic computing device communicatively coupled to the user computing device 110. Application interactions may include a variety of interactions with data performed by the application, such as the application opening a file, the application closing a file, the application modifying a file, the application creating a file, the application deleting a file, the application printing a file, the application compressing a file, the application accessing a file, the application opening an attachment to an email or other message, the application attaching a file to an email or other message, the application receiving a file, the application sending a file, and the application accessing properties of a file.

User interactions with network traffic may encompass a variety of network-related user interactions, such as the user receiving data communicated over a network, the user sending data over the network, and the user accessing data over the network. The network traffic may include, e.g., traffic over network 170, and/or traffic over other networks which the user computing device 110 is communicatively coupled to, including traffic with one or more peripherals (e.g., cameras, microphones, keyboards, mice, home appliances, home electronics, etc.) coupled to user computing device 110.

Each rule may also include a communication requirement associated with the filter parameter, such as communications requirements 122B, 122D, through 122Z. Each communication requirement defines the type of information to be communicated to the remote server in the event the user activity defined by the corresponding filter parameter is satisfied. For example, the filter parameter 122A may indicate the user opening a JPEG file, and the communication requirement 122B may identify contextual data (e.g., the application used to open the JPEG file) that is to be communicated as a result of (i.e., if the monitoring agent detects) the user opening a JPEG file. The communication requirements 122B, 122D, through 122Z may also include a recipient identifier identifying one or more recipients to which the information (identified by the communication requirements) should be communicated to in the event the corresponding filter parameter is satisfied.

Monitoring agent 116 may include software or hardware logic that is operable to monitor the user's activity. For example, the monitoring agent 116 may monitor the user's interaction via the user interface 112 with data accessible by the user computing device 110, the user's interaction with data communicated via communication interface 124, etc. The monitoring may include a variety of monitoring activities, such as monitoring the user's interaction with an operating system executing on the user computing device, monitoring applications caused to be executed by the user, monitoring the user's interaction with one or more applications, and monitoring network traffic caused by the user to be communicated over a network coupled to the user computing device. The monitoring agent 116 may generate information identifying the user's activity and communicate such information to the filtering agent 118. The monitoring agent 116 may perform additional or alternative operations as further described herein.

Filtering agent 118 may include software or hardware logic that is operable to receive, from the monitoring agent 116, information identifying the user's activity. The filtering agent 118 may have access to the rule definitions 122 and, using the rule definitions 122, determine whether any of the data-interaction conditions defined by the set of rules are satisfied by the user's interaction with the one or more data accessible by the user computing device. Using the rule definitions 122, the filtering agent 118 may also identify, upon determining that at least one of the data-interaction conditions defined by the set of rules is satisfied, information associated with the user's interaction that satisfied the at least one data-interaction condition. This may include identifying information including some or all of data 120A, metadata 120B, and contextual data 120C, stored in storage element 120.

User computing device 110 in certain embodiments is an electronic device that includes a variety of components such as a user interface, processor, communication interface, and storage element. However, it will be appreciated by those of ordinary skill in the art that such an electronic device could operate equally with fewer or a greater number of components than are illustrated in FIG. 3. Thus, the depiction of user computing device 110 in FIG. 3 should be taken as being illustrative in nature, and not limiting to the scope of the disclosure.

Figure 4:
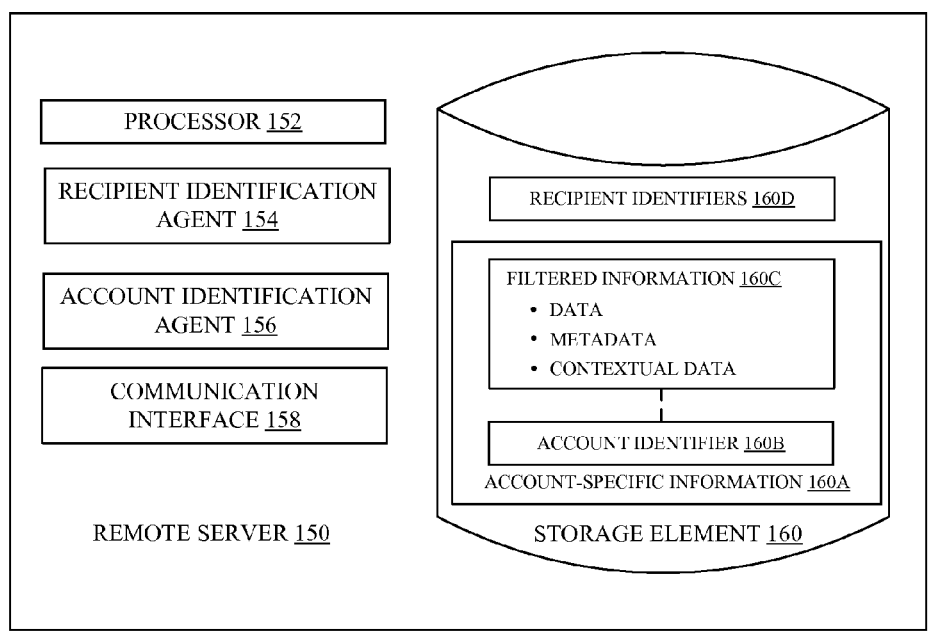
FIG. 4 is a simplified block diagram of a remote server according to an embodiment.

FIG. 4 is a simplified block diagram of remote server 150 according to an embodiment. The remote server 150 may include any suitable components typically found in such an electronic device necessary to perform the operations discussed herein. In one embodiment and as illustrated in FIG. 4, the remote server 150 includes a processor 152, a recipient identification agent 154, an account identification agent 156, a communication interface 158, and a storage element 160.

Processor 152 is any suitable computing processor or processors operable to execute instructions that cause remote server 150 to perform one or more of the operations discussed herein. For example, processor 152 may execute software code stored in one or more storage elements such as storage element 160. Communication interface 158 is any suitable interface or interfaces operable to enable communication between remote server 150 and other elements of system 100, such as user computing device 110 and/or recipient computing device 130.

Storage element 160 may be any storage element or storage elements suitable for storing data, software code, and other information used by remote server 150. For example, storage element 160 may include one or more of random access memory (RAM), read only memory (ROM), electrically-erasable programmable read only memory (EEPROM), a hard disk, an optical disk, etc. In some embodiments, storage element 160 may include account-specific information 160A for each of a plurality of user accounts, where each user account may be associated with an individual, a corporation, or other entity. The account-specific information 160A may include a variety of information such as an account identifier 160B that uniquely identifies the account, and filtered information 160C. Filtered information 160C may include information such as data, metadata, and/or contextual data that was communicated to the remote server by a user computing device in response to user's activities at the user computing device. The storage element 160 may also include one or more recipient identifiers 160D that identify intended recipients of some or all of the filtered information 160C. The recipient identifiers 160D may identify computing devices associated with the recipients, user names of the recipients, email address of the recipients, or other information that uniquely identifies the intended recipients.

Recipient identification agent 154 may include software or hardware logic that is operable to identify an intended recipient of data communicated to the remote server 150 by the user computing device 110. The recipient identification agent 154 may identify the intended recipient using a variety of techniques. In one particular embodiment, the recipient identification agent 154 may receive a recipient identifier from the user computing device 110 and determine the intended recipient from the received recipient identifier. The recipient identification agent 154 may perform additional or alternative operations as further described herein.

Account identification agent 156 may include software or hardware logic that is operable to identify an account (e.g., account-specific information 160A) associated with data communicated to the remote server 150 by the user computing device 110. The account identification agent 156 may identify the account using a variety of techniques. In one particular embodiment, the account identification agent 156 may receive a login name and password from the user computing device 110 prior to receiving other data from the user computing device 110, and may match the received login name to the account-specific information 160A. The account identification agent 156 may perform additional or alternative operations as further described herein.

Remote server 150 in certain embodiments is an electronic device that includes a variety of components such as a processor, various identification agents, one or more storage elements, and a communication interface. However, it will be appreciated by those of ordinary skill in the art that such an electronic device could operate equally with fewer or a greater number of components than are illustrated in FIG. 4. Thus, the depiction of remote server 150 in FIG. 4 should be taken as being illustrative in nature, and not limiting to the scope of the disclosure.

Figure 5:
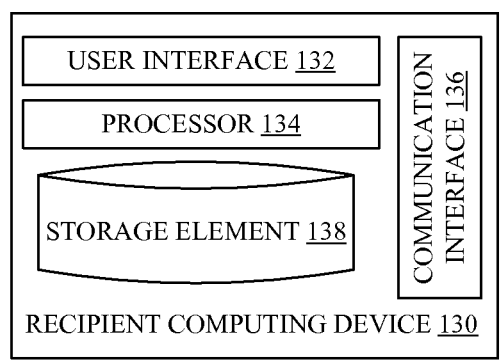
FIG. 5 is a simplified block diagram of a recipient computing device according to an embodiment.

FIG. 5 is a simplified block diagram of recipient computing device 130 according to an embodiment. The recipient computing device 130 may include any suitable components typically found in such electronic device necessary to perform the operations discussed herein. In one embodiment and as illustrated in FIG. 5, the recipient computing device 130 includes a user interface 132, a processor 134, a communication interface 136, and a storage element 138.

User interface 132 may include one or more elements for receiving input from a user and providing outputs to the user. For example, user interface 132 may include a keypad, a display, a touch screen, or a combination thereof. Processor 134 is any suitable computing processor or processors operable to execute instructions that cause recipient computing device 130 to perform one or more of the operations discussed herein. For example, processor 134 may execute software code stored in one or more storage elements such as storage element 138. Communication interface 136 is any suitable interface or interfaces operable to enable communication between recipient computing device 130 and other elements of system 100, such as remote server 150. Storage element 138 may be any storage element or storage elements suitable for storing data, software code, and other information used by recipient computing device 130. For example, storage element 138 may include one or more of random access memory (RAM), read only memory (ROM), electrically-erasable programmable read only memory (EEPROM), a hard disk, an optical disk, etc.

Recipient computing device 130 in certain embodiments is an electronic device that includes a variety of components such as a user interface, processor, communication interface, and storage element. However, it will be appreciated by those of ordinary skill in the art that such an electronic device could operate equally with fewer or a greater number of components than are illustrated in FIG. 5. Thus, the depiction of recipient computing device 130 in FIG. 5 should be taken as being illustrative in nature, and not limiting to the scope of the disclosure.

Figure 6A:
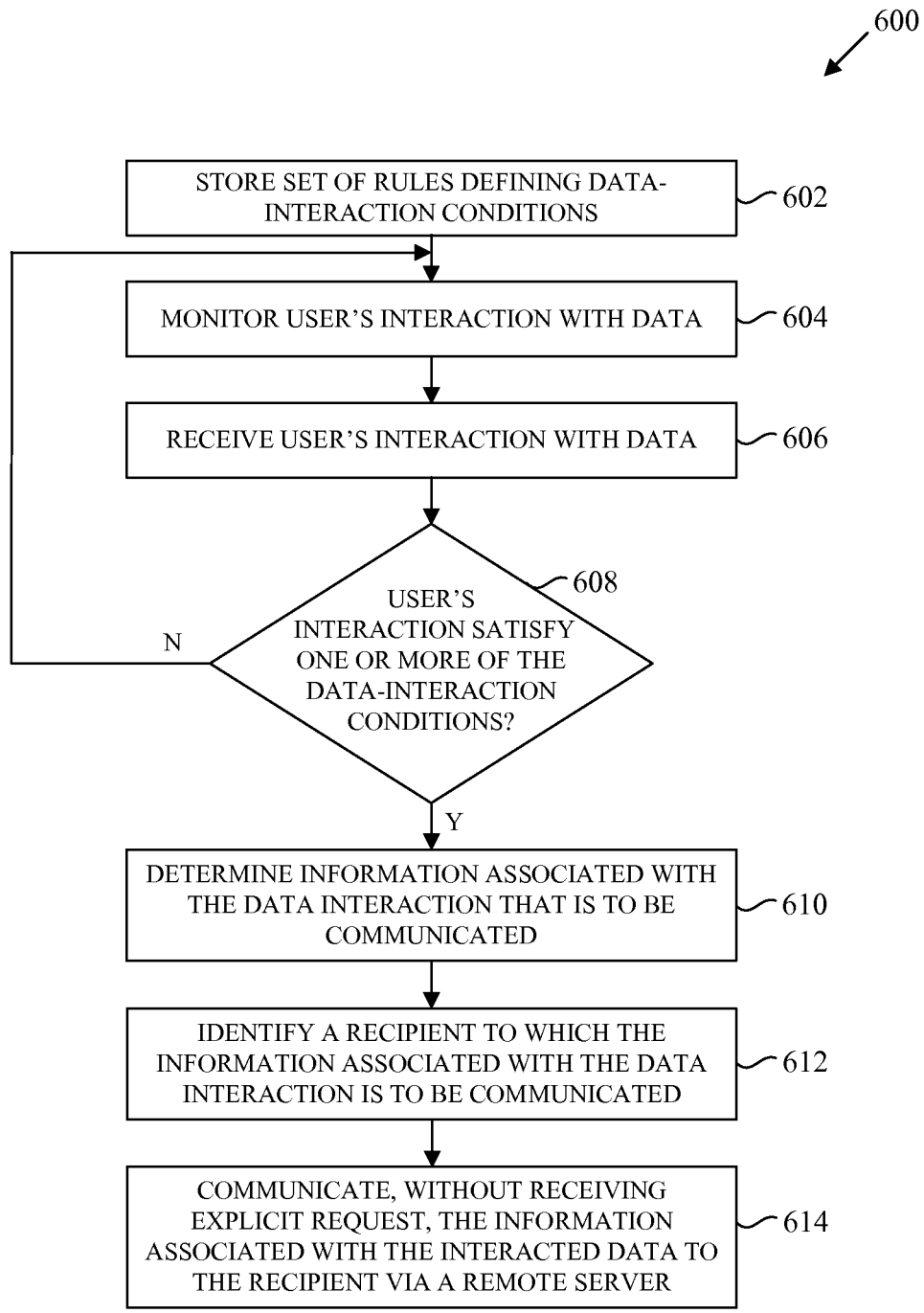
FIG. 6A is a flowchart depicting the operations of a user computing device to share data based on user interaction events according to an embodiment.

FIG. 6A is a flowchart 600 depicting the operations of a user computing device (e.g., user computing device 110) to share data based on user interaction events according to an embodiment. The example operations show one or more steps that may be executed by a user computing device to share data via a remote server.

In operation 602 the user computing device stores a set of rules defining data-interaction conditions. For example, the user computing device 110 may store the set of rules as rule definitions 122. The data-interaction conditions indicate different types of activities that a user of the user computing device can perform on one or more data accessible by (e.g., stored at or communicatively coupled to) the user computing device. For example, an activity may include creating a particular type of file (such as a spreadsheet). For another example, an activity may include opening one or more of a particular type of file, one or more particular types of files, or any file. For yet another example, an activity may include modifying a file. Data-interaction conditions are not so limited, however, and may include a variety of data-interactions, such as user interactions with data stored at the user computing device 110 or at an electronic device remote from the user computing device 110, the user causing an application to interact with data stored at the user computing device 110 or at an electronic device remote from the user computing device 110, the user interacting with network traffic over a network coupled to the user computing device 110, etc.

In operation 604 the user computing device monitors a user's interaction with data located at or accessible to the user computing device. For example, a user may interact with data, such as data 120A, metadata 120B, and/or contextual data 120C, stored in the storage element 120 of user computing device 110 via user interface 112. The user may interact with data in a variety of ways, such as opening a file, closing a file, modifying a file, creating a file, deleting a file, printing a file, compressing a file, accessing a file, opening an attachment to an email or other message, attaching a file to an email or other message, downloading a file from a remote server, uploading a file to a remote server, accessing properties of a file, causing an application to interact with a file, interacting with network traffic over a network coupled to the user computing device, etc. The user computing device (e.g., the monitoring agent 116) may monitor for all such interactions.

The applications being monitored may be stored and/or executed by the user computing device 110 or other entities of system 100, such as recipient computing device 130, remote server 150, or another electronic computing device communicatively coupled to the user computing device 110. The monitoring of applications may include monitoring for a variety of interactions with data performed by the application, such as the application opening a file, the application closing a file, the application modifying a file, the application creating a file, the application deleting a file, the application printing a file, the application compressing a file, the application accessing a file, the application opening an attachment to an email or other message, the application attaching a file to an email or other message, the application receiving a file, the application sending a file, and the application accessing properties of a file.

The monitoring of network traffic may encompass the monitoring of a variety of network-related user interactions, such as the user receiving data communicated over a network, the user sending data over the network, and the user accessing data over the network. The network traffic may include, e.g., traffic over network 170, and/or traffic over other networks which the user computing device 110 is communicatively coupled to, including traffic with one or more peripherals (e.g., cameras, microphones, keyboards, mice, home appliances, home electronics, etc.) coupled to user computing device 110.

In operation 606 one or more user interactions with data are received. For example, one or more user interactions may be received and identified by the monitoring agent 116 via the user interface 112.

In operation 608 the user computing device determines whether the user's interactions satisfy one or more of the data-interaction conditions defined by the set of rules. For example, the filtering agent 118 may compare the user interactions received and identified by the monitoring agent 120 to the data-interaction conditions defined by the set of rules. If there is a match, then it may be determined that the user interaction satisfies one of the data-interaction conditions and processing may continue to operation 610. If there is not a match, then it may be determined that the user interaction does not satisfy any of the data-interaction conditions and processing may return to operation 604. One particular embodiment for determining whether the user's interactions satisfy one or more of the data-interaction conditions is further described with reference to FIG. 6B.

In operation 610 the user computing device determines or otherwise identifies information associated with the interacted data that is to be communicated to the remote server. That is, the user computing device 110 may store and/or generate a variety of information, including data 120A, metadata 120B, and contextual data 120C. Some of this information will be related to the user interaction, whereas other of this information will not be related to the user interaction. In one particular embodiment, the filtering agent 118 determines the data, metadata, and/or contextual data that is associated with the user's activity. For example, when the user's activity is opening a spreadsheet, the filtering agent 118 may determine the spreadsheet that was opened, metadata of the spreadsheet, and contextual information regarding the opening of the spreadsheet. The filtering agent 118 may then determine which of this information is to be communicated to the remote server. In doing so, the filtering agent 118 may use the rule definitions 122. For example, the filtering agent 122 may read the communication requirement associated with the satisfied filter parameter and determine the information to be communicated to the server based on the read communication requirement.

In operation 612 the user computing device 110 identifies a recipient to which the information associated with the interacted data is to be communicated. The recipient may be in addition to or alternatively to the user that interacted with the data. For example, the recipient may be a recipient associated with the recipient computing device 130.

In one embodiment, the rule definitions 122 may include data-interaction conditions (e.g., filter parameters) that are each associated with one or more recipient identifiers (included in, e.g., communication requirements) that identify a recipient that should be provided access in the event the corresponding data-interaction condition is satisfied. For example, a data-interaction condition may be that an image file must be opened by the user. That data-interaction condition may be associated with a particular recipient identifier such as a recipient identifier identifying an entity that is capable of generating physical pictures from the digital image. When the data-interaction condition is satisfied as a result of the user opening an image file with the user computing device, the image file is communicated to that entity via the remote server 150. This may include the user computing device 110 communicating the recipient identifier together with the image file to the remote server 150 with an instruction instructing the remote server 150 send the image file to the recipient identified by the recipient identifier.

In operation 614 the information associated with the interacted data is communicated to the recipient via a remote server without receiving an explicit request from the user to do so. The information communicated to the recipient may include the data interacted with by the user, the information describing a context of the satisfied data-interaction, etc. In one particular embodiment, the information is communicated to the remote server 150 via the communication interface 116, and the remote server 150 may subsequently provide the intended recipient access to the information.

It should be appreciated that the specific operations illustrated in FIG. 6A provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 6A may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 6B:
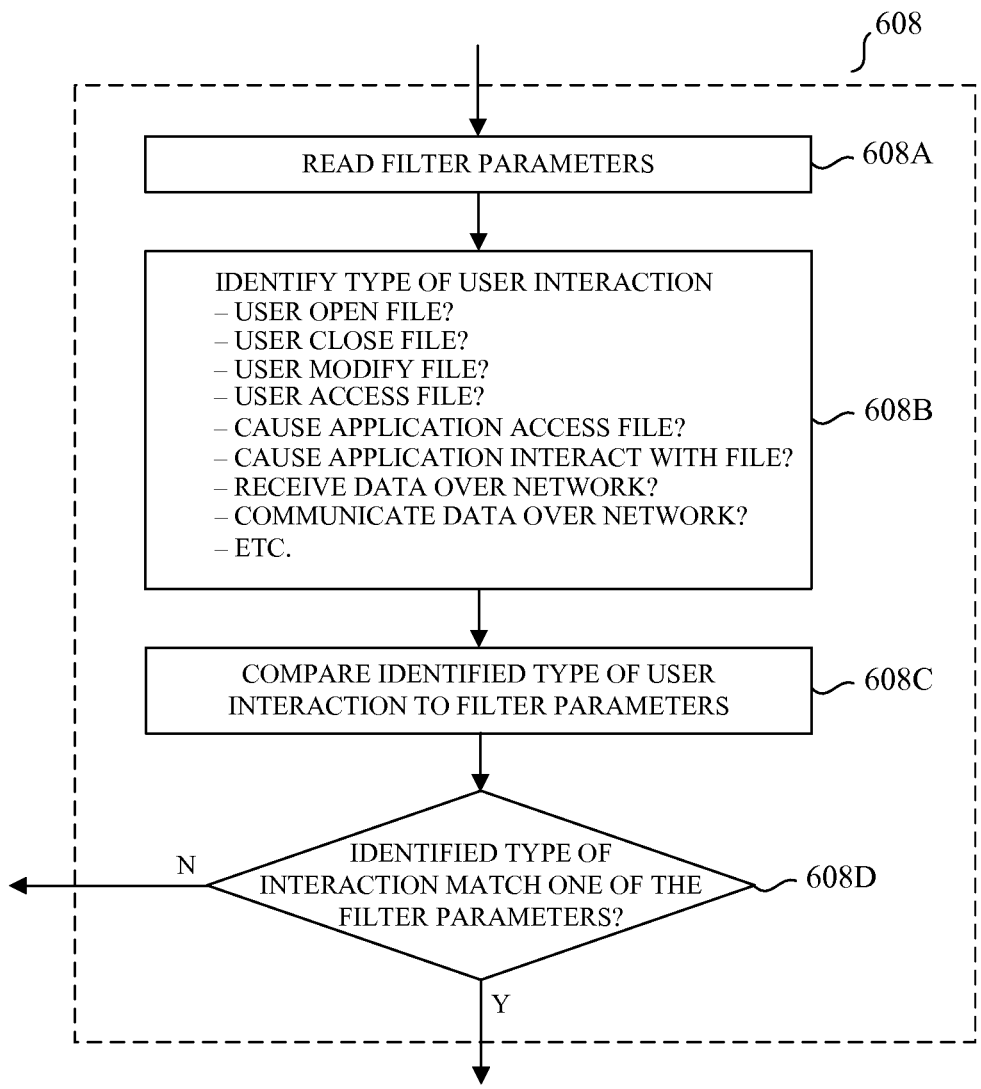
FIG. 6B is a flowchart depicting operations for determining whether a user's interaction satisfies one or more data-interaction conditions according to an embodiment.

FIG. 6B is a flowchart depicting operations for determining whether a user's interaction satisfies one or more data-interaction conditions according to an embodiment. In operation 608A filter parameters are read. For example, the filtering agent 118 may read the filter parameters 122A, 122C, through 122Y included in the rule definitions 110. In operation 608B the type of user interaction performed by the user is identified. For example, the filtering agent 118 may determine the type of user interaction based on information communicated to the filtering agent 118 from the monitoring agent 116. In operation 608C, the type of interaction identified by the monitoring agent 116 is compared to the filter parameters (e.g., filter parameters 122A, 122C, through 122Y) to see if there is a match. That is, the monitored user interaction is compared with the user activities defined by the read filter parameters. In operation 608D it is determined whether the type of interaction identified by the monitoring agent 116 matches one of the filter parameters. If the type of interaction identified by the monitoring agent 116 matches one or more of the filter parameters, then it is determined that the user's interaction satisfies one or more of the data-interaction conditions. Otherwise, it is determined that the user's interaction does not satisfy any of the data-interaction conditions.

It should be appreciated that the specific operations illustrated in FIG. 6B provide a particular method that may be executed by a client computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 6B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 7:
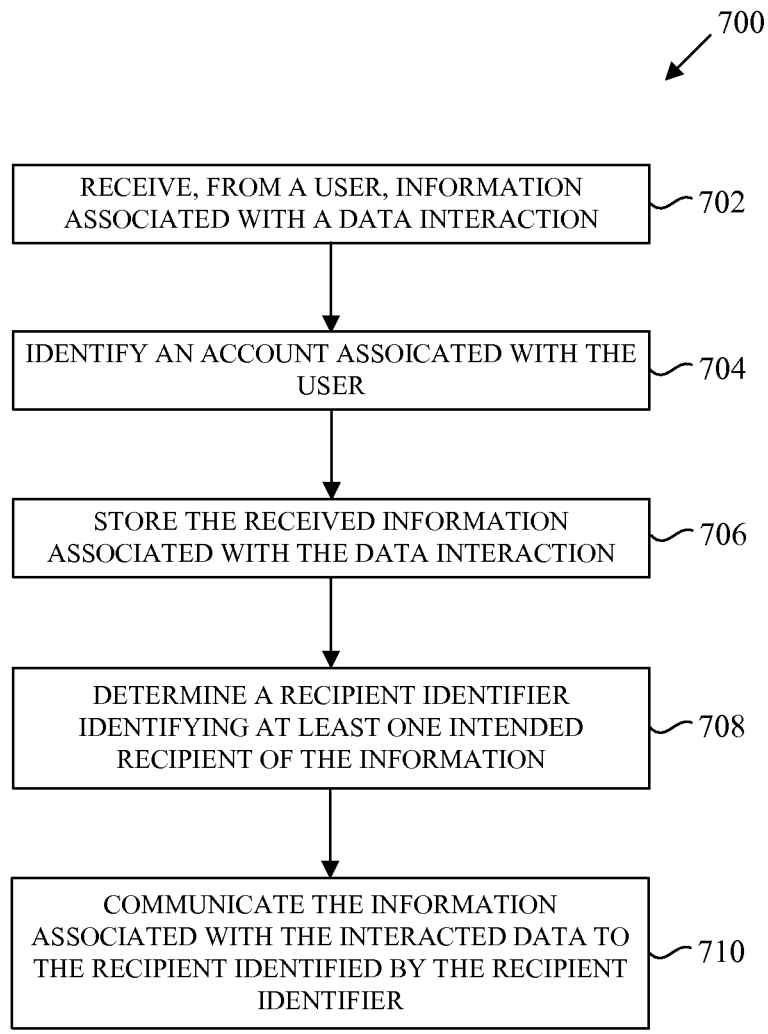
FIG. 7 is a flowchart depicting the operations of a remote server to share data based on user interaction events according to an embodiment.

FIG. 7 is a flowchart 700 depicting the operations of a remote server (e.g., remote server 150) to share data based on user interaction events according to an embodiment. The example operations show one or more steps that may be executed by a remote server to share data communicated to the remote server from a user computing device.

In operation 702 the remote server receives, from a user, information associated with a data interaction. For example, the remote server 150 may receive information from the user computing device 110 in response to the user computing device 110 determining that a user's interaction satisfied one or more data-interaction conditions. The information may include the data interacted with by the user, information describing a context of the satisfied data-interaction, etc.

In operation 704 the remote server identifies an account associated with the user. The remote server may host a plurality of different accounts each associated with a unique user, company, or other entity. The remote server may determine which account is associated with the user communicating data to the remote server using one or more of a variety of different techniques. In one embodiment the remote server 150 receives a user identifier from the user computing device 110 (e.g., a login name), and compares the received user identifier with an account identifier 160B associated with each account. If there is a match, then the remote server 150 may identify the account, such as the account-specific information 160A, that is associated with the user communicating data to the remote server 150.

In operation 706 the remote server stores the received information associated with the interacted data. The remote server may store the received information and associate the received information with the user's account. For example, the remote server may store the filtered information 160C including one or more of data, metadata, and/or contextual data communicated from the user computing device 110.

In operation 708, the remote server determines a recipient identifier identifying at least one intended recipient of the information. The recipient identifier may identify the user of the user computing device 110 and/or one or more recipients associated with one or more recipient computing devices 130. The remote server may determine the recipient identifier using any one or more of a number of techniques. For example, the remote server may receive the recipient identifier from the user computing device 110 when receiving data to be shared from the user computing device 110 and store the recipient identifier as recipient identifier 160D.

In operation 710 the remote server communicates the information associated with the interacted data to the recipient identified by the recipient identifier. For example, the remote server 150 may identify the intended recipient by reading the recipient identifier 160D. The remote server 150 may then communicate or otherwise provide the intended recipient with access to the information associated with the interacted data.

It should be appreciated that the specific operations illustrated in FIG. 7 provide a particular method that may be executed by a remote server, according to certain embodiments of the present invention. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 8:
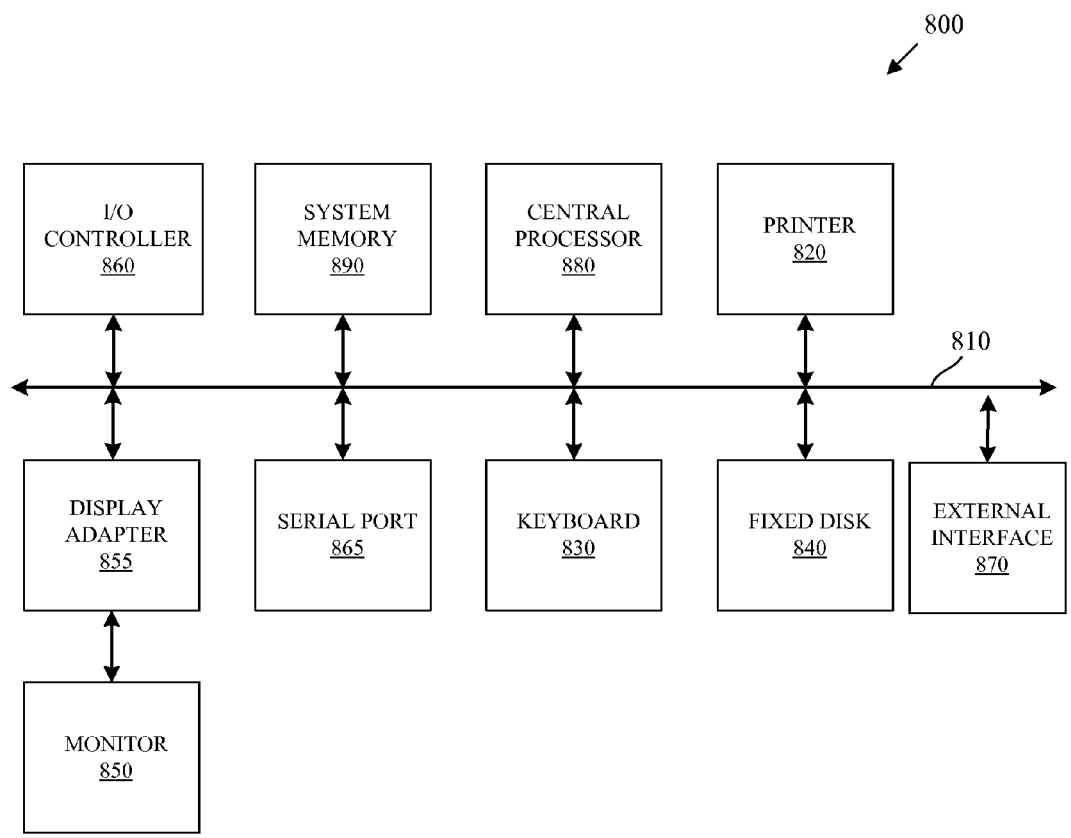
FIG. 8 is a diagram of a computer apparatus according to at least one embodiment.

FIG. 8 is a diagram of a computer apparatus 800 according to some embodiments. The various elements in the previously described system diagram (e.g., one or more of user computing device 110, recipient computing device 130, or remote server 150) may use any suitable number of subsystems in the computer apparatus to facilitate the functions described herein. Examples of such subsystems or components are shown in FIG. 8. The subsystems shown in FIG. 8 are interconnected via a system bus 810. Additional subsystems such as a printer 820, keyboard 830, fixed disk 840 (or other memory comprising tangible, non-transitory computer-readable media), monitor 850, which is coupled to display adapter 855, and others are shown. Peripherals and input/output (I/O) devices (not shown), which couple to I/O controller 860, can be connected to the computer system by any number of means known in the art, such as serial port 865. For example, serial port 865 or external interface 870 can be used to connect the computer apparatus to a wide area network such as the Internet, a mouse input device, or a scanner. The interconnection via system bus allows the central processor 880 to communicate with each subsystem and to control the execution of instructions from system memory 890 or the fixed disk 840, as well as the exchange of information between subsystems. The system memory 890 and/or the fixed disk 840 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method of operating a user computing device, the method comprising:
   storing, by the user computing device, a set of rules that define data-interaction conditions, the data-interaction conditions indicating different types of activities that a user of the user computing device can perform on one or more data accessible by the user computing device;
   monitoring, by the user computing device, the user's interaction with the one or more data accessible by the user computing device to determine whether any of the data-interaction conditions defined by the set of rules are satisfied by the user's interaction with the one or more data accessible by the user computing device; and
   upon determining that at least one of the data-interaction conditions defined by the set of rules is satisfied:
      identifying information associated with the user's interaction that satisfied the at least one data-interaction condition; and
      causing a remote server to share interacted data associated with the user's interaction satisfying the at least one data-interaction condition with one or more recipients by communicating the identified information associated with the user's interaction from the user computing device to the remote server, without receiving an explicit request from the user to communicate the identified information.

2. The method of claim 1, wherein the identified information includes the data interacted with by the user during the interaction that satisfied the at least one data-interaction condition.

3. The method of claim 1, wherein the identified information includes information describing a context of the user's interaction that satisfied the at least one data-interaction condition.

4. The method of claim 1, wherein the different types of activities include: the user opening a file, the user closing a file, the user modifying a file, the user creating a file, the user deleting a file, the user printing a file, the user compressing a file, the user accessing a file, the user opening an attachment to an email or other message, the user attaching a file to an email or other message, the user downloading a file from a remote server, the user uploading a file to a remote server, the user accessing properties of a file, the user causing an application to interact with a file, and the user interacting with network traffic over a network coupled to the user computing device.

5. The method of claim 4, wherein the application is executed by the user computing device or by a remote computing device.

6. The method of claim 4, wherein the application interactions include one or more of: the application opening a file, the application closing a file, the application modifying a file, the application creating a file, the application deleting a file, the application printing a file, the application compressing a file, the application accessing a file, the application opening an attachment to an email or other message, the application attaching a file to an email or other message, the application receiving a file, the application sending a file, and the application accessing properties of a file.

7. The method of claim 4, wherein the user interacting with network traffic includes one or more of: the user receiving data communicated over a network, the user sending data over the network, and the user accessing data over the network.

8. The method of claim 1, wherein monitoring the user's interaction with the one or more data includes one or more of:
   monitoring the user's interaction with an operating system executing on the user computing device;
   monitoring applications caused to be executed by the user;
   monitoring the user's interaction with one or more applications; and
   monitoring network traffic caused by the user to be communicated over a network coupled to the user computing device.

9. The method of claim 1, wherein determining whether any of the data-interaction conditions defined by the set of rules are satisfied by the user's interaction with the one or more data accessible by the user computing device includes:
   reading filter parameters defining user activities;
   comparing the monitored user's interaction with the user activities defined by the read filter parameters; and determining that at least one of the data-interaction conditions defined by the set of rules are satisfied by the user's interaction with the one or more data accessible by the user computing device when the monitored user's interaction matches at least one of the user activities defined by the read filter parameters.

10. The method of claim 9, wherein each filter parameter is associated with a communication requirement defining the type of information to be communicated to the remote server in the event the user activity defined by the filter parameter is satisfied.

11. The method of claim 10, wherein identifying information associated with the user's interaction that satisfied the at least one data-interaction condition includes:
reading the communication requirement associated with the filter parameter defining the user activity satisfied by the user's interaction with the one or more data accessible by the user computing device; and
determining information associated with the user's interaction that is of the type defined by the communication requirement.

12. The method of claim 10 wherein the communication requirement defines the type of information to be communicated as contextual data that describes a context of the user's interaction that matched the at least one user activity defined by the read filter parameters.

13. The method of claim 1, wherein the set of rules further define one or more recipients associated with at least one of the data-interaction conditions.

14. The method of claim 13, further comprising:
upon determining that one of the data-interaction conditions for which at least one recipient is associated with is satisfied, causing a recipient identifier identifying the at least one recipient to be communicated to the remote server.

15. A user computing device comprising:
a storage element for storing a set of rules that define data-interaction conditions, the data-interaction conditions indicating different types of activities that a user of the user computing device can perform on one or more data accessible by the user computing device;
a user interface for receiving user interactions with one or more data accessible by the user computing device;
a monitoring agent for monitoring the user's interaction with the one or more data accessible by the user computing device;
a filtering agent for:
receiving, from the monitoring agent, information identifying the user's interaction with the one or more data accessible by the user computing device;
determining whether any of the data-interaction conditions defined by the set of rules are satisfied by the user's interaction with the one or more data accessible by the user computing device; and
identifying, upon determining that at least one of the data-interaction conditions defined by the set of rules is satisfied, information associated with the user's interaction that satisfied the at least one data-interaction condition; and
a communication interface for causing a remote server to share interacted data associated with the user's interaction satisfying the at least one data-interaction condition with one or more recipients by communicating the identified information associated with the user's interaction from the user computing device to the remote server, upon the filtering agent determining that at least one of the data-interaction conditions defined by the set of rules is satisfied, and without receiving an explicit request from the user to communicate the identified information.

16. The user computing device of claim 15, wherein the identified information includes the data interacted with by the user during the interaction that satisfied the at least one data-interaction condition.

17. The user computing device of claim 15, wherein the identified information includes information describing a context of the user's interaction that satisfied the at least one data-interaction condition.

18. The user computing device of claim 15, wherein the different types of activities include: the user opening a file, the user closing a file, the user modifying a file, the user creating a file, the user deleting a file, the user printing a file, the user compressing a file, the user accessing a file, the user opening an attachment to an email or other message, the user attaching a file to an email or other message, the user downloading a file from a remote server, the user uploading a file to a remote server, the user accessing properties of a file, the user causing an application to interact with a file, and the user interacting with network traffic over a network coupled to the user computing device.

19. The user computing device of claim 15, wherein monitoring the user's interaction with the one or more data includes one or more of:
monitoring the user's interaction with an operating system executing on the user computing device;
monitoring applications caused to be executed by the user;
monitoring the user's interaction with one or more applications; and
monitoring network traffic caused by the user to be communicated over a network coupled to the user computing device.

20. A method of managing the storage of data, comprising:
monitoring, at a user computing device, a user's interaction with one or more data accessible by the user computing device to determine whether any of a plurality of data-interaction conditions defined by a set of rules are satisfied by the user's interaction with the one or more data;
upon determining that at least one of the data-interaction conditions is satisfied:
identifying information associated with the user's interaction that satisfied the at least one data-interaction condition; and
causing a remote server to share interacted data associated with the user's interaction satisfying the at least one data-interaction condition with one or more recipients by communicating the identified information associated with the user's interaction to the remote server, without receiving an explicit request from the user to communicate the identified information;
receiving, at the remote server, the identified information;
identifying, at the remote server, an account associated with the user; and
storing the received identified information at the remote server such that the identified information is associated with the account.

21. The method of claim 20, further comprising:
determining, at the remote server, an intended recipient of the identified information; and
communicating the identified information to the intended recipient.

22. The method of claim 20, wherein the set of rules define one or more recipients associated with each of the data-interaction conditions, and causing information associated with the data interacted with by the user to be communicated to the server includes causing a recipient identifier identifying the recipient associated with the satisfied data-interaction condition to be communicated to the remote server.

23. The method of claim 20, further comprising receiving, at the user computing device, the recipient identifier from the user, wherein causing information associated with the data interacted with by the user to be communicated to the server includes causing the recipient identifier to be communicated to the server.

24. The method of claim 20, wherein the information associated with the user's interaction that satisfied the at least one data-interaction condition includes contextual information describing a context of the user's interaction that satisfied the at least one data-interaction condition.

25. The method of claim 24, wherein storing the received identified information includes storing the contextual information describing a context of the user's interaction that satisfied the at least one data-interaction condition.

\* \* \* \* \*